Dec. 31, 1968   D. R. CAMPBELL ETAL   3,419,290
PIPE COUPLING

Filed Nov. 17, 1965   Sheet 1 of 2

INVENTORS
Donald R. Campbell
George Fallos
BY  Anthony R. Zine, Jr.

William D. Fosdick

AGENT

United States Patent Office

3,419,290
Patented Dec. 31, 1968

3,419,290
PIPE COUPLING
Donald R. Campbell, Painted Post, George Fallos, Horseheads, and Anthony R. Zine, Jr., Corning, N.Y., assignors to Corning Glass Works, Corning, N.Y., a corporation of New York
Continuation-in-part of application Ser. No. 340,358, Jan. 27, 1964. This application Nov. 17, 1965, Ser. No. 508,339
6 Claims. (Cl. 285—223)

ABSTRACT OF THE DISCLOSURE

A pipe coupling in which a flexible gasket having a rigid ring fixed thereto is held against the respective ends of the joined pipe section. The ends of the pipe section flare outwardly, and annular wedge-shaped inserts are located between the pipe ends and cylindrical bands surrounding the pipe ends. The inserts extend outwardly from the annular bands in a direction away from the pipe ends, and the clamping means bear against the exposed ends of the inserts. The respective clamping means are resiliently connected to one another.

---

This application is a continuation-in-part of our copending application Ser. No. 340,358, filed on Jan. 27, 1964, and now abandoned.

This invention relates to couplings having the ability to provide seals between sections of pipe which seals are capable of withstanding great differentials in pressure between the ambient atmosphere and the interior of the system of which the pipe sections are a part, while permitting relative angular movement between the joined pipe sections.

It is an object of the invention to provide a pipe coupling which permits angular displacement in any direction between two joined sections of pipe.

A further object is the provision of a coupling which includes a gasket which is sealed in such a manner that the strength of the seal is not effected by movement of one joined pipe section with respect to the other.

A further object is the provision of a coupling which includes means for strengthening a gasket forming a seal between joined pipe sections while permitting movement of the gasket to accommodate relative movement between the pipe sections.

A further object is the provision of a novel composite pipe structure which can easily be incorporated in a pipe coupling.

These and other objects, which will hereinafter become apparent, are accomplished by the provision of a coupling in which a flexible annular gasket is clamped independently against the ends of two joined pipe sections by clamping means which bear upon the gasket edges and upon the ends of wedge-shaped annular inserts located between flared pipe ends and cylindrical bands surrounding the pipe ends. The clamping means are resiliently connected.

Figure 1:
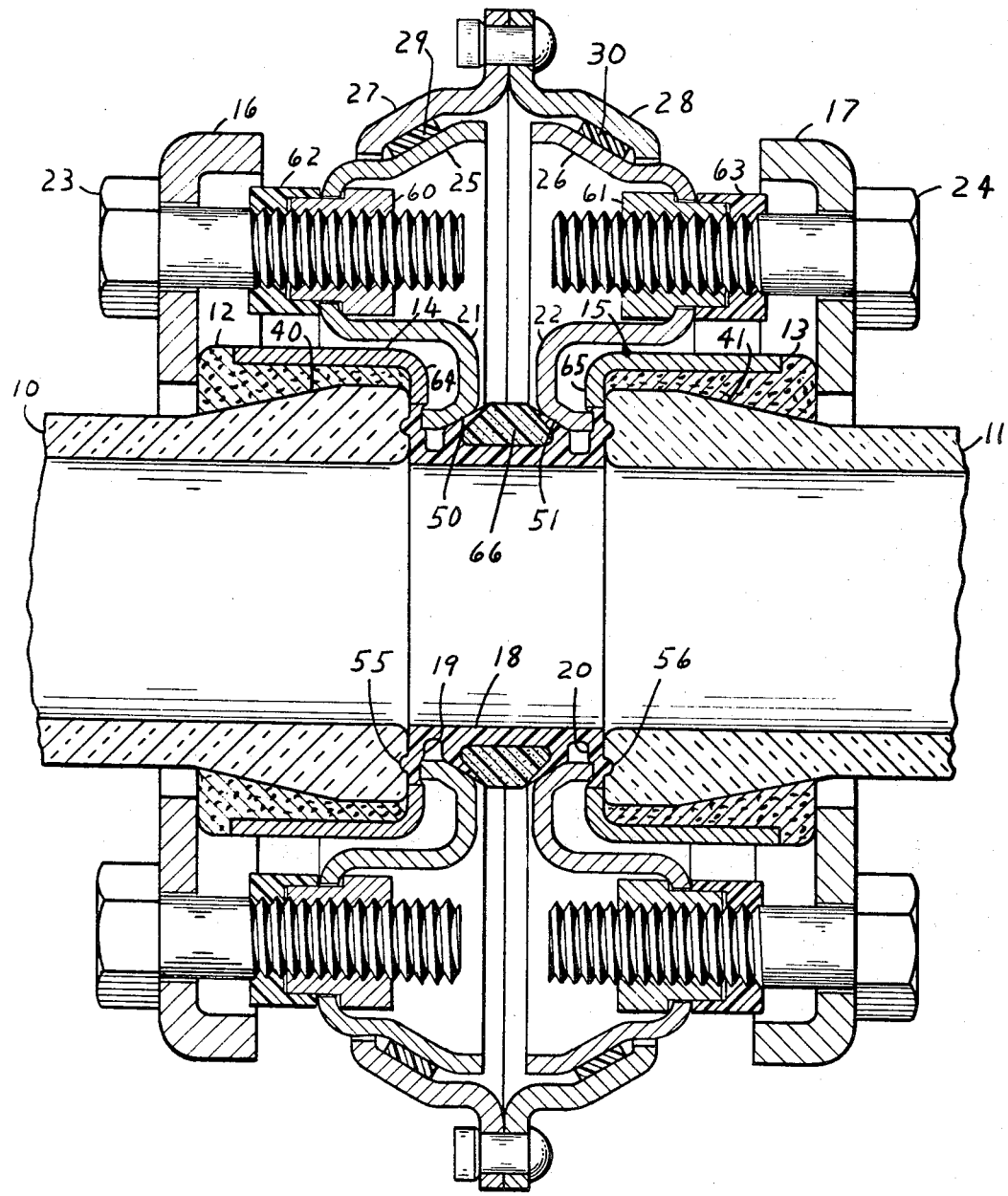
Figure 2:
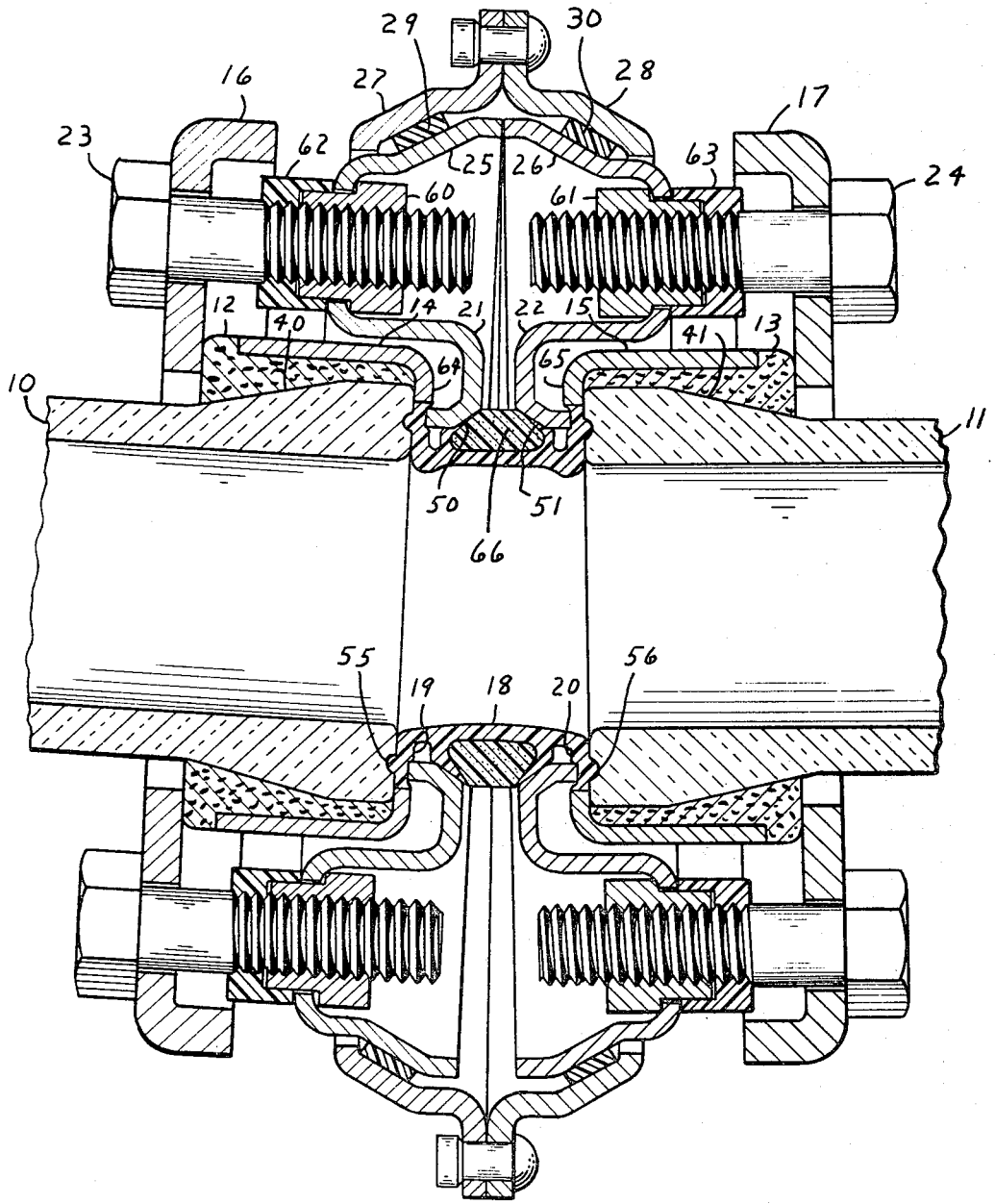

FIGURE 1 is an axial section view taken through a pipe coupling according to the invention with the joined pipe sections in axial alignment, and FIGURE 2 is an axial sectional view of the coupling of FIGURE 1 with the joined pipe sections out of axial alignment.

Referring to FIGURE 1, joined glass pipe sections 10 and 11 have outwardly flared end outer surface portions 40 and 41. Wedge-shaped glass fiber reinforced plastic inserts 12 and 13 are in the form of rings having generally cylindrical outer surfaces and inner surfaces generally complementary to the outer surface portions 40 and 41 of pipe sections 10 and 11. Each of inserts 12 and 13 may be in the form of a continuous annular ring which may be placed around its respective pipe section by passage over an unflared end thereof. Alternatively, the insert may be in the form of a split ring for ease of assembly. Inserts 12 and 13 are wedged between the outer surfaces of pipe sections 10 and 11 and cylindrical metallic bands 14 and 15, respectively, and pipe sections 10 and 11 are urged together by means of outer clamping rings 16 and 17, which bear upon the respective inserts 12 and 13.

Corrosion-resistant gasket 18, which preferably comprises polytetrafluoroethylene, has outwardly extending edge portions 19 and 20, which are clamped respectively between the ends of pipe sections 10 and 11 and inner clamping rings 21 and 22. Edge portions 19 and 20 have annular tongues 55 and 56 formed when clamping occurs, the tongues cold-flowing into corresponding annular grooves in the ends of the pipe sections. The respective pairs of outer and inner clamping rings 16 and 21 and 17 and 22 are drawn together by means of cap screws, such as 23 and 24, which are threaded into nuts 60 and 61, respectively. Polytetrafluoroethylene sleeves 62 and 63 are threaded over the respective screws and fit tightly around the respective nuts for the purpose of preventing the entrance of harmful vapors in the space between inner clamping rings 21 and 22. The outer clamping rings press against the resepctive inserts, and the inserts in turn press against the flared ends of the pipe sections and thereby force the pipe ends against one surface of edge portions 19 and 20 of gasket 18, while the inner clamping rings bear against the other surface of the gasket edge portions, thereby forming a seal between the inner clamping rings and the ends of the pipe sections by means of the gasket edge portions.

Cylindrical bands 14 and 15 have inwardly projecting flange portions 64 and 65 which bear against the ends of the respective pipe sections and terminate in the vicinity of the inner edges of inner clamping rings 21 and 22, and gasket edge portions 19 and 20, respectively. Thus, when the edge portions of the gasket are clamped tightly, cold flow of the compressed gasket portions is inhibited. The location of the inwardly projecting flange portions of the cylindrical bands has been found necessary in many applications where high degrees of compression are required, due to the cold-flow property of the polytetrafluoroethylene. In the absence of means for preventing outward cold flow of the polytetrafluoroethylene, leaks will occur, and, if additional clamping force is applied to stop the leaks, the gasket edge portions can be completely severed by the inner edges of the inner clamping rings.

Inner clamping rings 21 and 22 have outer edge portions 25 and 26 which have outer surfaces which are generally complementary to the inner surfaces of restraining bands 27 and 28, respectively. Between the inner surfaces of restraining bands 27 and 28 and the outer surfaces of clamping rings 21 and 22, respectively, are located polytetrafluoroethylene gaskets 29 and 30, which effectively produce the ball-and-socket joint which permits the outer edge portions of the inner clamping rings to move within the socket provided by the paired restraining bands 27 and 28.

Gasket 18 is provided with a strengthening insert 66 formed of a material which is more rigid than the gasket material. Inasmuch as gasket 18 is flexible, insert 66 prevents radial expansion or contraction of the gasket, while permitting reorientation of the entire gasket as the pipe sections are angularly displaced with respect to one another, as illustrated in FIGURE 2. Insert 66 may comprise any rigid material capable of withstanding high temperatures, for example, a high-temperature thermosetting polyester resin reinforced with fiber glass. Such resin may be, for example, one of the family of "Atlac" polyester resins available from Atlas Chemical Industries.

Since gaskets 29 and 30 are slightly resilient, outer edge portions 25 and 26 of the inner clamping rings are able to move within the socket-like enclosure provided by restraining bands 27 and 28 as pipe sections 10 and 11 are angularly displaced with respect to one another even though the mating surfaces of the respective gaskets are not spherical surfaces. Although resilient gaskets having conical surfaces have been found satisfactory for use in couplings of the present type, wherein angular displacements are usually not greater than approximately 3°, it will be appreciated that where greater flexibility is desired, the outer surfaces of the inner clamping rings and the inner surfaces of the restraining bands may be portions of spheres.

The configuration of the present coupling during angular axial displacement of the respective pipe sections is illustrated in FIGURE 2. Pipe section 11 has been rotated in the plane of the drawing approximately 3° counterclockwise. The top portion of inner clamping ring 22 has been displaced in the direction of inner clamping ring 21, while the bottom section thereof has been displaced away from the bottom section of inner clamping ring 21. Gasket reinforcing insert 66 has been forced downwardly by contact with inner annular surface portions 50 and 51 of inner clamping rings 21 and 22.

It will be seen that pipe section 11, inner clamping ring 22, the part of gasket edge portion 20 which is clamped between the end of pipe section 11 and inner clamping ring 22, along with outer clamping ring 17, band 15, insert 13, cap screw 24 and nut 61, comprise a single rigid system when the cap screw is tightened, and no reorientation of these parts with respect to one another is effected when relative angular displacement between the respective pipe sections is effected. Thus, axial pipe reorientation does not affect the seal formed between the inner clamping ring and the end of pipe section 11 by means of gasket edge portion 20. A similar seal is effected with gasket edge portion 19 by means of the corresponding means associated with pipe section 10. Thus, the respective means which seal the gasket edge portions to the pipe sections are independently movable, and relative movement between the pipe sections neither weakens nor strains the seal provided by the present coupling.

It will be appreciated that gasket reinforcing insert 66 is of particular advantage in couplings of the present type. In addition to preventing radial expansion and contraction of the gasket when the interior of the pipe system is subjected respectively to pressure above and below that of the ambient atmosphere, longitudinal compression of the gasket is prevented due to the fact that the reinforcing ring has a finite longitudinal dimension and the inner edges 50 and 51 of inner clamping rings 21 and 22 bear against the edges of the gasket, thus limiting the movement of the inner clamping rings toward one another.

A composite pipe structure, such as that comprising pipe section 10, insert 12 and band 14, has been found to be a particularly useful structure for incorporation in pipe couplings of various types, inasmuch as it is easy to retain the structure within a coupling by the expedient of a clamping ring, such as outer clamping ring 16. Accordingly, inasmuch as the illustrated sub-combination has utility in and of itself, it is considered to be an element of the present invention.

The advantages of the present invention may be provided by structures varying in their details from that illustrated as a preferred embodiment of the invention. For example, in place of the resilient gaskets employed in the illustrated embodiment of the present coupling in conjunction with restraining bands 27 and 28 and outer edge portions 25 and 26 of the inner clamping rings, the inner clamping rings might be resiliently connected by means of springs. Accordingly, it is intended that the scope of the present invention be limited only by the scope of the appended claims.

We claim:
1. A coupling joining opposed ends of two sections of pipe having outwardly flared and outer surface portions, said coupling comprising generally cylindrical bands surrounding each said end outer surface portion and defining with said end outer surface portion wedge-shaped annular spaces, each said space being occupied by a ring having an edge extending beyond said band in a direction away from said opposed ends, outer clamping means bearing upon said edges of said rings, said outer clamping means being independently movable with respect to one another and urging said rings in the direction of said opposed ends, a gasket occupying an annular space between said opposed ends of said pipe sections, independently movable inner annular clamping means pressing edge portions of said gasket against said opposed ends of said pipe sections to form annular seals therewith, and means associated with each said pipe section for urging said outer and inner clamping means associated with said pipe section toward one another to form two independently movable substantially rigid structures, each said structure including one said pipe end outer surface portion, one said outer clamping means and one said inner clamping means.

2. A coupling according to claim 1 which includes means for resiliently connecting said substantially rigid structures.

3. A coupling according to claim 1 in which said gasket includes a ring having a length substantially less than the length of said gasket, said ring being of greater rigidity than said gasket.

4. A coupling according to claim 3 which includes resilient connecting means between said substantially rigid structures.

5. A coupling according to claim 1 in which each said generally cylindrical band has an inwardly projecting flange portion abutting against one said opposed end of said pipe sections and against the periphery of one said edge portion of said gasket so as to prevent the outward flow of said gasket edge portion as said gasket edge portion is pressed between said inner annular clamping means and said pipe end.

6. A coupling between two sections of pipe, said coupling comprising a flexible gasket occupying an annular space between opposed ends of said pipe sections, first means for clamping said gasket against a surface of one of said pipe sections in the vicinity of its said opposed end to effect an annular seal therewith, second means for independently clamping said gasket against a surface of the remaining of said pipe sections in the vicinity of its said opposed end to effect an annular seal therewith, said first and second means being independently movable with respect to one another, and means for resiliently connecting said first and second means, said gasket including an annular member fixed thereto, said annular member being more rigid than said gasket and extending longitudinally for a distance less than the longitudinal extent of said gasket.

References Cited

UNITED STATES PATENTS

| | | | |
|---|---|---|---|
| 1,948,211 | 2/1934 | Fritz | 285—223 X |
| 2,053,626 | 9/1936 | Parker | 285—234 |
| 2,308,745 | 1/1943 | English. | |
| 3,016,161 | 1/1962 | Peplin | 285—229 X |
| 3,212,798 | 10/1965 | Lewis et al. | 285—368 |

FOREIGN PATENTS

| | | |
|---|---|---|
| 1,158,776 | 12/1963 | Germany. |
| 865,244 | 2/1953 | Germany. |
| 372,335 | 4/1932 | Great Britain. |
| 705,415 | 3/1954 | Great Britain. |

EDWARD C. ALLEN, *Primary Examiner.*

THOMAS F. CALLAGHAN, *Assistant Examiner.*

U.S. Cl. X.R.

285—423; 277—206, 101